Aug. 6, 1940.  C. L. BEAL  2,210,160
SYSTEM FOR STORING LATEX
Filed Dec. 13, 1938
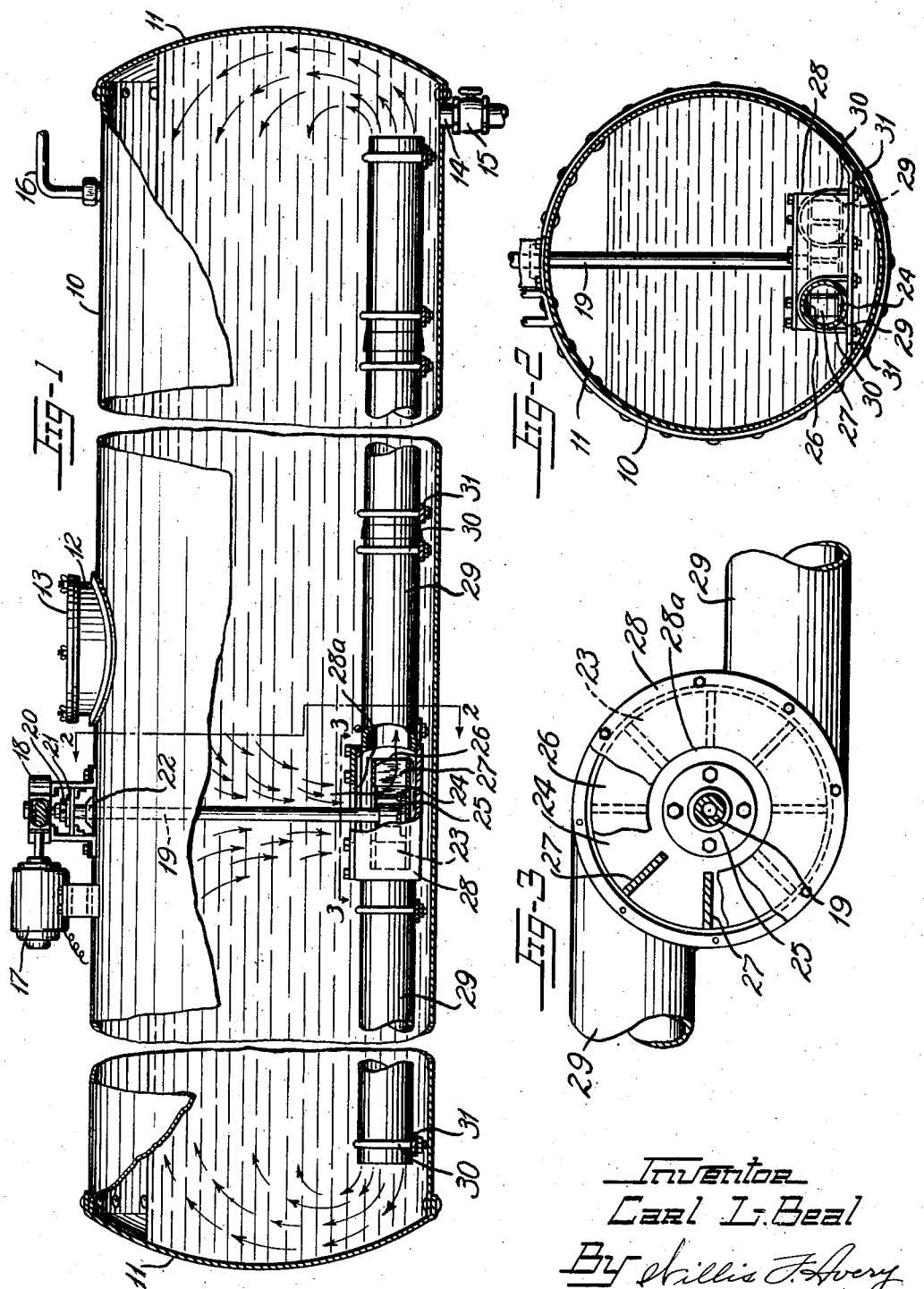
Inventor
Carl L. Beal
By Willis F. Avery
Atty Patented Aug. 6, 1940

2,210,160

UNITED STATES PATENT OFFICE 2,210,160

SYSTEM FOR STORING LATEX

Carl L. Beal, Cuyahoga Falls, Ohio, assignor to American Anode Inc., Akron, Ohio, a corporation of Delaware Application December 13, 1938, Serial No. 245,428

6 Claims. (Cl. 259—95)

This invention relates to systems for storing aqueous dispersions of rubber such as natural rubber latex and other complex liquids which tend to become heterogeneous during storage under ordinary conditions, and is particularly concerned with the provision of a system for storing bulk quantities of such complex liquids and for maintaining the bulk quantities of liquid in a homogeneous condition during storage.

Rubber latex is a very complex liquid material consisting essentially of minute particles of rubber colloidally suspended in water containing minor proportions of natural colloids and other materials. The rubber latices ordinarily used in commercial operations are preserved by the addition of a small quantity of ammonia or other alkali, and contain from 30% to 70% total solids by weight, depending upon the extent to which the natural rubber latex has been concentrated by the removal of water. When latex is allowed to stand for more than a short time, evaporation of water and volatile preservatives from the exposed surface portions of the latex causes a thin film of more or less firm coagulum to form on the surface, a phenomenon ordinarily referred to as "skinning over." Also, the suspended rubber particles tend to rise to the top of the liquid body to produce an upper layer or zone relatively rich in rubber content while depleting the lower layers or zones and leaving them relatively poor in rubber content, a phenomenon known in the art as "creaming." Furthermore, latex is quite sensitive to many outside influences. Slight variations in temperature effect substantial changes in the viscosity of the latex and high temperatures cause complete coagulation. Latex is coagulated by frictional contacts between surfaces immersed in the latex. Even violent agitation will bring about considerable coagulation. All these and other phenomena tend toward heterogeneity in the latex.

The complex character and sensitive nature of latex must constantly be taken into account when handling the material, and special care must be exercised in shipping, storing, and using latex in commercial operations, in which, of course, a homogeneous latex of standard characteristics is essential. Until fairly recently, however, these factors have not become serious problems because the quantities of latex used have been relatively small and the latex usually has been shipped to this country and stored in steel drums of about fifty-eight gallons capacity. In such small bulk, the various tendencies toward heterogeneity usually are not of serious consequence and even if, for example, the latex does cream in the drum, it will be re-homogenized when the drum is emptied into a tank for compounding and use in accordance with the usual practice. With the steadily increasing use of latex in a variety of commercial applications, however, it has more recently become necessary to provide facilities for handling bulk quantities of latex. Raw latex now is shipped to this country in tank steamers and is transferred directly to large storage tanks holding thousands of gallons of latex, or is shipped inland in tank cars and there transferred to similar large storage tanks.

This practice has tended greatly to emphasize the tendencies toward heterogeneity in the stored latex and has presented serious practical problems which were not satisfactorily solved by conventional expedients. The many difficulties which were encountered in attempting to maintain a condition of substantial homogeneity in, for example, a bulk quantity of eleven thousand gallons of latex stored in a tank forty feet long and seven feet in diameter may well be appreciated. In addition to overcoming all the tendencies toward heterogeneity already pointed out, it became necessary to insure homogeneity between different lots of latex added to the tank at different times and under different conditions. Several systems and methods of maintaining homogeneity in bulk quantities of latex have been tried, but none has proved to be entirely satisfactory.

It is accordingly the chief object of the present invention to provide a simple, economical, and efficient storage system for handling bulk quantities of rubber latex and other complex liquid materials, that is quantities measured in thousands of gallons, and to provide means for maintaining such bulk quantities in a substantially homogeneous condition during storage.

In general, the invention contemplates providing a storage tank of large capacity preferably having a relatively long longitudinal dimension and a relatively short transverse dimension to provide an economical structure, and providing circulator means for setting up a plurality of oppositely directed, generally longitudinal currents within the stored complex liquid, the currents originating in a zone near the center of the tank, being directed in opposite directions to points substantially removed from the zone of origination, and turning upward and flowing back to the zone of origination, meanwhile sweeping the surface of the liquid. The invention constantly intermixes portions of the liquid bulk drawn from widely separated zones of the tank, maintains substantially the entire bulk of liquid in a constant state of gentle non-turbulent flow, and effects a continual changing of the liquid latex surface, all without mechanical friction or other deleterious disturbances within the latex.

The manner in which the objects of the invention are attained may be readily understood from the following detailed description of a typical latex storage system embodying the principles of the present invention, the detailed description and the accompanying drawing being based upon an actual commercial installation which has proved to be extremely effective in maintaining homogeneity in bulk quantities of latex.

Of the accompanying drawing,

Fig. 1 is an elevation showing the principal parts of a latex storage system embodying the present invention, a considerable portion of the tank wall as well as other portions of the structure being broken away for clarity of illustration;

Fig. 2 is a vertical section taken on line 2—2 of Fig. 1; and

Fig. 3 is a horizontal section taken on line 3—3 of Fig. 1.

The typical storage system illustrated in the drawing comprises a conventional cylindrical steel storage tank 10, having outwardly bowed ends 11, 11, and a manhole 12 provided with a cover 13. The tank is mounted in a horizontal position upon any desirable type of support. A pipe 14 communicates with the interior of the tank at the bottom thereof for conducting liquid material to and from the tank as controlled by the valve 15 in the pipe line and other valves and pipes not shown. It is desirable to force the latex up into the tank under pressure rather than to let it flow in through an opening at the top in order to avoid undue splashing and entrapment of air in the latex. An air line 16 communicates with the interior of the tank at the top thereof for supplying compressed air to force the latex out of the tank when it is desired to convey it to a higher level for use. In the typical installation illustrated, the storage tank was forty feet long and seven feet in diameter and therefore had an effective capacity of around eleven thousand gallons of latex.

A motor 17 and worm gear unit 18 are mounted outside the tank in such manner as to drive a shaft 19 which extends through an opening in the top or other portion of the tank above the normal level of latex in the tank, downward through the interior of the tank to a point near the bottom thereof. The shaft 19 is carried solely by a thrust collar 20 operatively resting on a thrust bearing 21, and is unsupported and unguided within the tank in order to eliminate all mechanical frictional contacts in the latex. A gland packing 22 is provided to close the opening in the tank wall around the shaft.

Mounted on the lower end of the shaft 19 in a normally submerged position near the bottom of the tank is provided a centrifugal impeller wheel 23. The impeller wheel 23 comprises a lower circular plate 24, to which is attached a hub 25 which engages the shaft 19. Spaced above the lower plate 24 is provided an upper, annular plate 26 having a relatively large central opening for admitting latex and through which the shaft 19 passes. Between the two plates 24 and 26 are provided several radially disposed vertical vanes 27, 27, each extending from the inner to the outer edge of the annular plate 26.

Surrounding the impeller wheel 23 is provided a sheet metal impeller housing 28 which preferably is designed to allow considerable free space at all points between the impeller wheel and the housing walls for permitting lumps of coagulum or foreign material to pass through the impeller without obstructing the rotation of the impeller wheel. The top of the impeller housing 28 is provided with a relatively large central circular opening 28a through which the shaft 19 passes and which serves as an intake opening for admitting latex to the impeller.

The impeller wheel 23 and the impeller housing 28 constitute a rotary or centrifugal impeller which serves to impart gentle, non-turbulent flow to the latex. The impeller is not an efficient pump and it is not intended that it should be. Efficient pumps have been found less satisfactory for imparting gentle flow to the latex than is the impeller described.

For directing the flow of latex from the impeller, two tangential discharge conduits 29, 29 extend horizontally in opposite directions from the sides of the impeller housing 28, in the rotation plane of the impeller, to points preferably near the bottoms of the respective ends of the tank 10.

The impeller housing 28 and the discharge pipes 29, 29, are mounted, by means of U bolts 30, 30, upon a number of cross-bars 31, 31 which span the curved bottom of the tank at spaced points longitudinally of the circulator assembly.

In the commercial system described, the discharge conduits 29, 29 were eleven inches in diameter and the impeller wheel was driven at a slow speed of 60 to 80 R. P. M.

In operation, the tank is filled to a desired level with latex and the impeller unit is driven continuously, latex being added and withdrawn at will without stopping the circulation. The impeller imparts a gentle non-turbulent flow to the latex and maintains substantially the entire bulk of latex in constant motion in two oppositely directed currents following generally the courses indicated by the arrows on the drawing. As will be noted, the currents originate in the central zone of the tank, flow outward through the two discharge conduits 29, 29, and are directed upward and back to the central zone by the outwardly bowed ends 11, 11 of the tank with minimum turbulence. The entire body of the latex is maintained in constant motion, the surface is continually changed, and latex from opposite ends of the tank is continually intermixed in the central zone and particularly in passing through the impeller.

Actual use of the described system over an extended period has proved its efficiency in maintaining bulk quantities of latex in a homogeneous condition. The simplicity of construction, low cost, and ease of operation are manifest. Frictional coagulation of the latex is entirely eliminated as there are no mechanical frictional contacts within the latex. Certainty of uninterrupted operation is assured by the wide clearances in all parts. No attention is required. Efficient circulation and constant intermixing of the latex are positively achieved without violent agitation. Other advantages of the system will be evident to the skilled artisan.

To achieve thorough intermixing of the latex in very long tanks, it is highly desirable to locate the impeller at an intermediate point and to discharge the latex at two separated points considerably removed from the impeller in order to set up two oppositely directed currents traversing approximately the same distances as shown and described. In shorter tanks, however, it is possible to have one discharge conduit relatively short with respect to the other, or even to eliminate one discharge conduit entirely and place the impeller adjacent one end of the tank with the single discharge conduit extending a considerable distance from the impeller. Although such a system will effect somewhat less intermixing of the latex, it will maintain the bulk of the liquid, including the surface, in constant circulatory motion and so will assist materially in overcoming heterogeneity.

Although particularly adapted for storing raw rubber latex, the system obviously may be employed for storing compounded latices, artificial dispersions of rubber and other materials, and indeed any liquid material in which the assured maintenance of homogeneity during storage is important.

I claim:

1. A system for storing bulk quantities of aqueous dispersions of rubber and similar complex liquid materials which normally are subject to creaming, skinning over or other phenomena tending toward heterogeneity during storage, said system comprising a horizontally disposed, substantially closed tank adapted to hold bulk quantities of the complex material, the length of said tank being several times greater than the width, and circulator means for maintaining the complex liquid in a substantially homogeneous condition during storage in the tank, said circulator means comprising driving means disposed outside the tank, a shaft driven thereby and extending downward into the tank through an opening in the wall thereof at a position spaced a substantial distance from each end of the tank, said shaft being unsupported and unguided within the tank, an impeller wheel mounted on said shaft in a lower zone of the tank, a housing about the impeller wheel, said housing having an intake opening for admitting liquid material to the impeller, and two discharge conduits extending from said housing in generally opposed directions to points adjacent the bottoms of the opposite ends of the tank.

2. A system for storing liquid materials, comprising a tank adapted to contain a quantity of the liquid material and circulator means for maintaining the liquid material in a substantially homogeneous condition during storage in the tank, said circulator means comprising driving mechanism disposed outside the tank, a shaft driven thereby and extending downward into the tank through an opening in the wall thereof above the normal level of liquid within the tank, said shaft being unsupported and unguided within the tank, a centrifugal impeller wheel mounted on said shaft in a normally submerged position within the tank, a housing about the impeller wheel, said housing having an intake opening for admitting liquid material and a discharge conduit extending from said housing for a substantial distance in the rotation plane of the impeller, said impeller being adapted to impart gentle non-turbulent flow to latex.

3. A system for handling liquid materials, comprising a substantially closed tank of cylindrical configuration having outwardly bowed ends, the length of the tank being substantially greater than its diameter and the tank being disposed in a horizontal position whereby the bottom is curved transversely and the outwardly bowed ends are disposed in horizontally spaced-apart positions, and circulator means for setting up and maintaining a gentle, non-turbulent flow of liquid material in the tank in a plurality of oppositely directed currents, said circulator means comprising driving mechanism disposed outside the tank, a shaft driven thereby, said shaft extending through an opening in the tank wall above the highest normal level of liquid within the tank and thence downward without further support or guidance to a normally submerged point adjacent the curved bottom of the tank at a position substantially spaced from either end of the tank, a centrifugal impeller wheel mounted on said shaft for rotation in a horizontal plane adjacent the bottom of the tank, a housing about the impeller wheel, the housing being substantially spaced from the wheel at all points, an intake opening in the housing for admitting liquid material, and a plurality of discharge conduits extending from the housing in generally opposed horizontal directions adjacent the bottom of the tank to points respectively adjacent each of the bowed ends of the tank, the apparatus being free of frictional mechanical engagements within the body of liquid in the tank.

4. A system for handling liquid materials, comprising a tank having a relatively long longitudinal dimension and a relatively short transverse dimension, the tank being disposed with its longer dimension in a generally horizontal plane, and circulator means for setting up and maintaining a continuous flow of liquid material in the tank, said circulator means comprising a centrifugal impeller wheel mounted for rotation in a horizontal plane in a normally submerged lower zone of the tank substantially spaced from either end of the tank, a loose-fitting housing about the impeller wheel, an intake opening in the housing for admitting liquid material, at least two discharge conduits extending from the housing in generally opposed directions to longitudinally spaced-apart discharge points respectively adjacent to the ends of the tank, and driving means for rotating the impeller wheel, said driving means being free of frictional mechanical engagements within the body of liquid in the tank.

5. Apparatus for handling aqueous dispersions of rubber and similar complex liquid materials which normally are subject to creaming, skinning over or other phenomena tending toward heterogeneity, said apparatus comprising a tank, driving mechanism located above the highest normal level of liquid in the tank, a shaft driven thereby, said shaft extending from the said driving mechanism downward into a normally submerged zone of the tank without support or guidance in any zone normally subject to submergence, a paddle-wheel type liquid impeller mounted on the shaft in a normally submerged zone for rotation in a generally horizontal plane, a loose-fitting cylindrical housing about the impeller wheel, a central intake opening in the housing, a peripheral discharge opening in the housing and a discharge conduit extending from the discharge opening for a substantial distance in a generally horizontal direction substantially aligned with the rotation plane of the impeller wheel.

6. Apparatus for handling liquid material, said apparatus comprising a tank having a long dimension in a generally horizontal plane, a conduit system disposed wholly within the tank at a normally submerged level and extending for a substantial portion of the horizontal length of the tank, said conduit system having at least two discharge openings at widely spaced-apart points and an intake opening at an intermediate point between the two discharge openings, and means also disposed within the tank at a normally submerged level for forcibly causing liquid material to flow into the conduit system through said intake opening, the apparatus being so constructed and arranged as to maintain liquid material in the tank in a constant state of flow in a plurality of currents wholly within the tank, said currents originating in a common zone between the ends of the tank and adjacent said intake opening, flowing outward from the zone of origination in generally opposed directions through the conduit system, discharging from the conduit system at the said widely-spaced apart discharge openings, and returning to the common zone of origination through an upper zone of liquid in the tank including the liquid surface, whereby liquid materials from widely separated zones of the tank are continually intermixed and the surface of the liquid is continually changed.

CARL L. BEAL.